United States Patent
Krause et al.

(10) Patent No.: US 9,199,856 B2
(45) Date of Patent: *Dec. 1, 2015

(54) METHOD FOR OBTAINING MAGNETITE

(75) Inventors: Eberhard Krause, Hohen Neuendorf (DE); Valentin Rohm, Munich (DE)

(73) Assignee: KRAUSE-ROHM-SYSTEME AG, Munich (DE)

( * ) Notice: Subject to any disclaimer, the term of this patent is extended or adjusted under 35 U.S.C. 154(b) by 1110 days.

This patent is subject to a terminal disclaimer.

(21) Appl. No.: 12/298,575

(22) PCT Filed: Apr. 25, 2007

(86) PCT No.: PCT/EP2007/054056
§ 371 (c)(1), (2), (4) Date: Oct. 27, 2008

(87) PCT Pub. No.: WO2007/128695
PCT Pub. Date: Nov. 15, 2007

(65) Prior Publication Data
US 2009/0175782 A1    Jul. 9, 2009

(30) Foreign Application Priority Data
May 4, 2006  (DE) .......................... 10 2006 020 840

(51) Int. Cl.
*C01G 49/08* (2006.01)
*C01F 7/06* (2006.01)
*C04B 18/04* (2006.01)

(52) U.S. Cl.
CPC ............... *C01F 7/066* (2013.01); *C01G 49/08* (2013.01); *C04B 18/0409* (2013.01); *Y02W 30/91* (2015.05)

(58) Field of Classification Search
CPC ...... C01F 7/066; C04B 18/0409; C01G 49/08
USPC ................... 423/138, 151, 632, 633
IPC ............................ C01G 49/08; C22B 3/00, 7/00
See application file for complete search history.

(56) References Cited

U.S. PATENT DOCUMENTS 2,964,383 A * 12/1960 Kamlet ........................... 75/419
3,295,924 A    1/1967 Colombo
3,876,749 A    4/1975 Horvath et al.
4,059,672 A   11/1977 Davis et al.
4,464,352 A *  8/1984 Autzen et al. ................. 423/634
4,876,022 A * 10/1989 Yamazaki et al. ......... 252/62.56

FOREIGN PATENT DOCUMENTS

| BE | 676016 A | 6/1966 | |
| CN | 1090085 A | 7/1994 | |
| DE | 1206411 | 12/1965 | |
| DE | 3831838 A1 | 3/1990 | |
| EP | 0604849 A2 | 7/1994 | |
| GB | 990403 A * | 4/1965 | ............. C01F 7/066 |
| SU | 1684323 A1 | 10/1991 | |
| WO | 2005042405 A | 5/2005 | |

OTHER PUBLICATIONS

English Translation of BE676016.*
Xiang et al., "Low-temperature reduction of ferric iron in red mud", TMS Light Metals: Light Metals. Proceedings of the Technical Sessions, Technical TMS Annual Meeting, XX, XX, 2001, pp. 157-162.
Piga L. et al., "Recovering Metals from Red Mud Generated During Alumina Production", JOM, Minerals Metals & Materials Society, Warrendale, PA US, vol. 45, No. 11, Nov. 1, 1993, pp. 54-59.
Mark, H. F., et al., "Kirk-Othmer Encyclopedia of Chemical Technology, Edition 3, Supplement Volume: Alcohol Fuels to Toxicology.", 1978, Wiley & Sons, New York, US, p. 220-p. 221.
Elvers, B., et al., "Ullmann's Encyclopedia of Industrial Chemistry, Edition 5, vol. A14: Immobilized Biocatalysts to Isoprene", 1989, VCH Verlag, Weinheim, DE, p. 479-480.
Klopries, B., "Catalytic hydroliquefaction of biomass with red mud and Co0-Mo03 catalysts", Fuel, vol. 69, Apr. 1990, pp. 448-455.
PatBase Machine Translation of German patent DE3831838 A1 for Process for the Utilisation of Steel Works Filter Dust and Similar Material, Date of translation: Dec. 10, 2013.

* cited by examiner

*Primary Examiner* — Jun Li
(74) *Attorney, Agent, or Firm* — Barlow, Josephs & Holmes, Ltd.

(57) ABSTRACT

The invention relates to a method for obtaining magnetite using red mud, which is produced by the method used by Bayer for the manufacture of aluminum. The method according to the invention comprises at least the reduction of hematite and/or goethite to form magnetite using at least one reductant, said reductant containing at least one vegetable oil and/or a fat and/or carbon.

10 Claims, No Drawings

US 9,199,856 B2

METHOD FOR OBTAINING MAGNETITE

PRIOR ART

Red mud develops in the aluminum production according to the Bayer method. Chemically considered, red mud is a mixture mainly composed of iron(III) oxides or hydroxides, respectively, titanium oxides, alumina residues, quartz sand, calcium oxide and sodium oxide. Due to its high content of residual caustic soda lye, it additionally has a strongly basic pH value in the range between 11 and 13. The name red mud originates from the red color caused by iron(III) oxide. To each produced ton of aluminum, according to the quality of the used bauxite, 0.5 to 1.5 tons of red mud arise as a non-avoidable attendant. The amount of red mud arising each year in this manner is several millions of tons and presents a serious economical and ecological problem together with the amounts of red mud already present in the meantime.

Heretofore, red mud is essentially regarded as waste and therefore fed to disposal. Therein, the disposal of the red mud is mostly effected by storage in sealed disposal sites. This form of storage is costly and expensive since large deposition site areas and plants are required and high cost is incurred for the transport of the red mud. Additionally, the long-term cost incurred by the deposition can only difficultly be calculated and present an additional economical problem besides the various ecological problems. Therefore, there is increased interest to feed red mud to an economically advantageous use to relevant extent. Particularly in the course of increasing raw material shortage, deposition of millions of tons of a material such as red mud containing several valuable products is to be deemed little reasonable. Since red mud contains a proportion of 30% to 60% of iron(III) compounds in the form of hematite ($Fe_2O_3$) and goethite ($FeO(OH)$) according to the quality of the originally used bauxite, it lends itself to recovery of iron or iron ore, respectively, in particularly advantageous manner. However, therein, the processing of the red mud is aggravated among other things by the particles of the red mud having a very small diameter on average in the range between 0.1 and 1.0 µm conditioned by the manufacturing process. Particularly separation of the iron(III) compounds from the residual mineral stock not containing iron therefore presents a complex technical problem and could not be resolved heretofore in satisfactory manner.

In GB 731 923 a method for thermal treatment of thermally reactive, finely distributed solid particles is disclosed. Therein, among other things, red mud from the Bayer method can be introduced into a fluidized-bed reactor and be maintained in a pseudo-liquid fluidized-bed state by means of a gas stream conducted through the red mud from below. For starting the reaction, the formed aerosol has to be heated to a predetermined temperature, and this temperature has to be maintained as constant as possible during the reaction in order that conversion of hematite to magnetite can occur. For heating the reaction mixture to the target temperature, therein, either preheating of the gas stream, injection and combustion of fossil fuels in the reaction room or combination of both is provided. In case that the reaction proceeds exothermic and the predetermined temperature is exceeded due to the arising amount of heat, the invention provides that the excess amount of heat is absorbed by inert solids disposed in the fluidized-bed reactor. Alternatively, it is provided that cooling water is injected into the reaction room or additional cooling, inert solids are admixed.

In this method, the circumstance is to be regarded as disadvantageous that the method does not disclose any possibility of separating the iron containing components of the red mud. Furthermore, it is to be regarded as disadvantageous that an expensive plant is required for performing the method by the requirement of a fluidized-bed reactor, which requires elaborate control technique for maintaining the fluidized-bed state and for exact temperature control of the fluidized bed, has a high energy requirement and consumes large amounts of fossil fuels. Additionally, goethite also present in the red mud cannot be converted into magnetite by the method, such that the method can only be performed with high losses of iron containing valuable products.

Therefore, the object of the present invention is to provide a large-technically realizable method, which allows an extensive, economically and ecologically advantageous recovery of the iron containing components of red mud and is suitable both for coping with the annually arising amounts of red mud and for processing the already deposited red mud.

PRESENTATION OF THE INVENTION

According to the invention, the object is solved by a method for obtaining valuable products by means of red mud having the features of claim 1.

Advantageous developments with convenient and non-trivial further developments of the invention are described in the further claims.

According to the invention, red mud produced by the Bayer method used for aluminum production is employed in a method for obtaining magnetite, which includes at least the reduction of hematite and/or goethite to magnetite with at least one reductant, wherein the reductant includes at least a vegetable oil and/or a fat and/or carbon. Such a method offers various advantages. Magnetite is the thermodynamically most stable iron oxide and has a spinel structure $AB_2O_4$, in which iron(II) ions occupy the octahedral places and iron(III) ions occupy the tetrahedral places. In contrast to hematite and goethite, magnetite is highly ferromagnetic. The method according to the invention therefore allows by conversion of the iron containing components separation of the red mud into magnetizable iron ore and a non-magnetizable low-iron residual mineral stock presenting in turn a valuable product and being variously usable. Vegetable oils are worldwide available in great variety and in large amounts. The Federal Environmental Agency categorizes vegetable oils for example in the water hazard classification 1 and thus as only low hazardous to water. Thereby, in economically and ecologically advantageous, particularly simple and sustainable manner, the possibility is opened to exploit regrowing biological compounds as an environmentally friendly alternative to fossil mineral oils for obtaining iron ore. Another advantage is in the possibility to be able to perform the method both continuously and discontinuously. Since, moreover, it is not required to employ highly pure oils as reductants, further cost can be saved by the use of roughly pressed or contaminated vegetable oils. In this manner, even waste products of the vegetable oil industry can be fed to a sustainable utilization and be used for obtaining iron ore. The use of these compounds thus presents another simple, globally applicable as well as economically and ecologically advantageous possibility of reaction direction and obtaining iron ore. Since vegetable oils are worldwide available, the method according to the invention is also suitable for application in remote processing plants. Alternatively or additionally, vegetable or animal fats, respectively, can also be used. Since alumina factories producing red mud in processing bauxite to alumina usually employ carbon-fired boilers for the heating steam generation, the employment of carbon as a biogenic hydrocarbon offers the advantage that the transport amount merely has to be correspondingly increased. In countries such as Australia or Brasilia where inexpensive hard coal of high quality is virtually unlimited available, thereby, significant reduction of the process cost is achieved.

In an advantageous development of the invention, a palm oil and/or a soya oil and/or a rape oil is used as the vegetable oil. Particularly palm oils, soya oils or rape oils are suitable for use within the scope of the method according to the invention, since, economically considered, they are inexpensive and globally available educts. Additionally, as already mentioned, they are appreciated as largely unproblematic under environmental aspects due to their biological degradability.

In another advantageous development of the invention, the method includes the following steps: a) mixing the red mud with the reductant, b) combusting the reaction mixture with controlled air supply during a predetermined time interval in a predetermined temperature range, c) separating the solid components from the reaction mixture, d) crushing the solid components, and e) separating at least a first component including at least magnetite from at least a second solid component. The advantages of this approach are clearly apparent to the person skilled in the art. The intense mixing of the red mud with the reductant can be effected directly in a usual, technically non-sophisticated reaction vessel without previous processing steps. Therein, suitable reactor types include for example continuous-flow reactors, rotary kilns or all of the other suitable reactor devices. The conductance of reaction itself is effected in simple manner by combustion of the reaction mixture. Therein, it is advantageously provided that the reaction is effected during a predetermined time interval with controlled air supply in a predetermined temperature range in order to be able to direct the proceeding of reaction in controlled manner depending on the employed educts. Additionally, at least the vegetable oil or fat, respectively, functions as an oxygen source together with various oxides from the red mud itself. The solid components of the developed reaction mixture are separated from the liquid and gaseous components, respectively, after proceeding of the reaction. Therein, the end of the reaction can be determined in particularly simple manner by the color change from red ($Fe_2O_3$) to black ($Fe_3O_4$). The separation of the solid from the liquid and/or gaseous components is performed in simple manner with the aid of a solid separator and/or gas separator coupled to the reaction vessel. However, further suitable separating devices are also conceivable. According to the selected educts and reaction conditions, after separation, the solid components can be present in a form partially clotted or bound together. Therefore, the method provides crushing of the solid components in step d) for facilitating and improving the further processing. For this, the mass can be milled in known manner, whereby the original, fine particles develop again. From the thus obtained powdered mixture of the solid components, in the last step of the method, at least a first component including at least magnetite is separated from at least a second component. Thereby, decomposition of red mud into iron ore and a low-iron residual mineral stock is achieved and extensive utilization of the various red mud components is permitted.

In another advantageous development of the invention, it is provided that in step b) of the method the air supply is controlled such that the reaction proceeds under sub-stoichiometric conditions. In this manner, one advantageously obtains generation of additional valuable products together with the use of vegetable oils and/or fats and/or carbon as the reductant. The thus selected reaction conditions result in a reaction sequence similar to the production of wood gas and provide various utilizable compounds such as elemental carbon, carbon dioxide, carbon monoxide, methane, ethene, hydrogen and water steam. The developing elemental carbon advantageously serves as an additional reductant and accelerates the reaction. Additionally, by control of the oxygen supply, possibility of control of the reaction temperature can be realized in simple and inexpensive manner. The additionally developing valuable products can be separated and fed to further purposes of use in known manner. In another advantageous development of the invention, it is provided that the predetermined temperature range in step b) of the method is at least 650° C. and/or at most 1000° C. Therein, the conductance of the reaction in the mentioned temperature range advantageously ensures that the reaction conditions can be selected depending on the character and requirements of the used reductant, thereby ensuring a variable, simple and cost-reducing possibility for optimum process direction.

In another advantageous development of the invention, it is provided that combustion gases developing in step b) of the method are returned into the reaction mixture. Since various further oxidizable hydrocarbon compounds such as methane or ethene develop in the reaction besides carbon dioxide, return of these gases into the reaction room allows a complete oxidation and thereby an optimum yield of thermal process energy.

In another advantageous development of the invention, it is provided that the combustion gases returned in step b) of the method include at least carbon monoxide and/or hydrogen. Therein, each one of the two compounds acts as an additional reductant. The combustion gas return thus provides for complete utilization of the utilizable reaction products and reaction energy on the one hand as well as for an accelerated conversion of hematite and/or goethite into magnetite on the other hand. Additionally, further cost reduction is achieved due to the reduced requirement for reductant. The combustion gas return thus advantageously allows a faster, more beneficial and ecologically optimized process configuration.

In another advantageous development of the invention, it is provided that the method includes an additional step f) before step c), in which the air supply is controlled for a time interval to be determined such that the reaction proceeds under stoichiometric and/or over-stoichiometric conditions. This is advantageous particularly towards the end of the reaction since incompletely oxidized compounds such as for example elemental carbon or compounds originating from the combustion gas return such as carbon monoxide are completely combusted by supply of a stoichiometric or over-stoichiometric amount of oxygen, respectively. In this manner, besides utilization of the maximally obtainable thermal energy, complete reduction of the iron(III) compounds can also be achieved. The over-stoichiometric reaction direction additionally allows the transformation of all of the hydroxides present in the red mud into corresponding oxides and thereby achieves a dramatic decrease of the alkalinity of the highly alkaline red mud, which in turn presents one of the main problems of the red mud utilization. Thus, the subsequent separation or division of the solid components, respectively, is also facilitated since the solid phase only includes oxides or silicates well to handle.

In another advantageous development of the invention, it is provided that step e) of the method includes the use of a magnetic separator. By the reduction of the non-magnetic compounds hematite and/or goethite to the highly ferromagnetic magnetite, the use of a device using this physical characteristic for separation is of particular advantage. In an ore separated in this manner, the concentration of pure magnetite with at least 90% is about two times as high as in qualitatively high-grade natural ore. Thus, technically particularly simple and inexpensive possibility can be provided to separate the red mud virtually quantitatively into qualitatively high-grade, magnetizable iron ore and into components not containing iron with the aid of a magnetic separator. However, the use of alternative or additional separating methods making use of other physical or chemical differences of the compounds to be separated such as for example flotation separating methods is also conceivable.

In another advantageous development of the invention it is provided that in step a) at least one further component including at least calcium carbonate is additionally admixed to the red mud and the reductant. Therein, the calcium carbonate can be advantageously introduced in the form of limestone and serves as a reaction promoter. Thus, it allows a more complete and faster conductance of reaction using an inexpensive starting material, whereby further savings for the entire process can be achieved. In another advantageous development of the invention, it is provided that the second component separated in step e) of the method includes at least one cement addition material. Therein, the low-iron residual mineral stock particularly lends itself to the cement addition material. Without separation of the iron containing component, red mud could not be used for this purpose since complex reactions referred to as corrosion would occur by the high iron content. Particularly in combination with additional admixture of calcium carbonate in step a) of the method, thus, the mineral formation is promoted and one obtains a hydraulic cement finding use in the construction industry as one of the most important binders due to its high strength and durability. However, the subsequent or additional addition of a certain mass proportion of calcium carbonate or limestone, respectively, is also conceivable, wherein a final concentration of about 10% (w/w) has proven particularly advantageous.

In another advantageous development of the invention, it is provided that the cement addition material includes silica and/or silicates and/or aluminosilicates. Thereby, with the aid of the method according to the invention, virtually all of the minerals can be obtained from red mud, which are of crucial importance to the particular characteristics of cement. Portland cement is for example composed of ca. 58 to 66% calcium oxide (CaO), 18 to 26% silica ($SiO_2$), 4 to 10% alumina ($Al_2O_3$) and 2 to 5% iron oxide ($Fe_2O_3$). In the manufacturing process of cement, first of all, di- and tricalcium silicate (2/3 $CaOxSiO_2$), tetracalcium aluminate ferrite (4 $CaOxAl_2O_3xFe_2O_3$) and tricalcium aluminate (3 $CaOxAl_2O_3$) form from these main components. By admixture of further compounds to the cement addition material, moreover, the chemical and physical characteristics of the cement to be manufactured can be specifically influenced. Thus, extensive utilization of all of the red mud components is achieved by the method according to the invention.

Further advantages, features and details of the invention are apparent from the following descriptions of several embodiments.

EXAMPLE 1

Red mud with a water content of about 30% is mixed with rape oil in the weight ratio of 2:1 to 10:1 in a quartz glass vessel. The reduction of the iron(III) compounds is started by igniting the rape oil. The end of the reaction can be determined by the color change from red ($Fe_2O_3$) to black ($Fe_3O_4$). Complete conversion of the iron(III) compounds can be achieved optionally by further addition of rape oil. After cooling, the solid, black-yellowish phase is first separated from potentially present liquid residual components by filtration. The thus obtained particles bound together are crushed in a mill and after milling separated into magnetite and non-magnetic cement raw materials (silicates and sand) with the aid of a magnetic separator.

EXAMPLE 2

Red mud from bauxite decomposition contains iron oxides/hydroxides in the form of the minerals hematite $Fe_2O_3$ and goethite FeO(OH) in 42-50% (w/w), clay minerals of the aluminosilicate group above 30% (w/w), $SiO_2$ in amounts between 5 and 10% (w/w) and lime from the recovery of caustic soda lye in 3-5% (w/w). The water content of red mud usually is between 25 and 40% (v/w). This mineral mixture is homogeneously mixed with waste fats or waste vegetable oils, respectively, such as frying oil, in a mixer without heat supply. The supplied proportion of vegetable oil or vegetable fat, respectively, should be at least 20% (w/w) in order to ensure a self-supporting combustion.

Subsequently, the pasty red mud mass is guided into a pellet press via a transporting screw, in which pellets for combustion are produced, wherein reduction of the aqueous components occurs by pressing. After further drying, the pellets are transported to a pellet furnace with residual heat and combusted there with controlled oxygen supply. Therein, first, for a time period of 10-20 min., it is worked with excess of air or oxygen, respectively, wherein combustion temperatures of about 900-1000° C. are reached. Under these conditions, various materials contained in the red mud are oxidized, wherein reduction from hematite to magnetite is partially already observed, because the oxygen penetration into the interior of the pellets is obstructed. Subsequently, the air supply is reduced such that the reactions proceed under sub-stoichiometric conditions. Thereby, the reaction temperature can decrease down to ca. 650° C., thereby occurring pyrolysis of the still present organic components in parallel, and $CO_2$, $H_2$ and CO are allowed to develop. Additional CO is formed from $CO_2$ and developed free carbon in further reaction by the Boudouard reaction.

From this step on, the combustion gases are returned into the furnace to ensure the reducing action particularly of the gases $H_2$ and CO for the transformation of hematite into magnetite. Therein, an alternating operation with sub- or over-stoichiometric air supply, respectively, has proven advantageous in order to avoid the formation of too much of carbon and thus the formation of iron carbides. The result of the method depends on the operational parameters, the composition of the red mud, the mass proportion and the type of the vegetable oil, the reaction temperature and the control of the air supply. Already in the simplest design of the method with permanent excess of air, according to laboratory results, up to 75% magnetite and 8% ilmenite are found in the separated magnetic mineral.

Subsequent to the reduction, the reduced fine powder is transported into a cooling drum with heat exchanger and after sufficient cooling fed to a magnetic separator in the next stage. It separates the components magnetite and ilmenite (iron titanium ore) due to their highly magnetic characteristics.

There remain non-magnetic clay minerals, quartz and lime as well as small amounts of non-magnetic iron ore. The clay minerals can be employed as a cement addition, since their chemical composition largely corresponds to the materials occurring in cement, and so-called iron cement can be produced. By addition of further burnt lime, the hydraulic character of the cement addition can be matched to the respective requirement. Moreover, the non-magnetic mineral residue is usable as a water retainer, soil improver or mineral fertilizer due to the clay minerals, the lime content and the iron content.

EXAMPLE 3

The general conductance of the method corresponds to that delineated in the previous embodiment. However, instead of a vegetable oil or a fat, respectively, a solid press residue from the vegetable oil production or wood chips are mixed to the red mud of the order of up to 20% (w/w) as the reductant. This organic addition is combusted and results in complete oxidation occurring only with high excess of air. Under nearly stoichiometric conditions, on the contrary, reduction of the iron ores to magnetite to a proportion of at least 75% occurs. With deficiency of air, coking products develop. Too high carbon proportion results—as already mentioned—in formation of non-magnetic carbides of the iron as manifests in reduction of the magnetically separable amount of red mud mineral mixture.

EXAMPLE 4

In the present case, the method already known from the previous embodiments is performed with powdered carbon as the reductant. For performing, red mud is mixed with 3-20% (w/w) powdered carbon in a pre-mixer and guided to a rotary kiln via a drying screw preheated with waste heat. The redox reactions are continuously effected in this furnace optionally with or without aid of a supporting fire. Alumina factories usual at present dispose of calcination furnaces with capacities of up to 8000 t per day. This technology can be employed here without great modification.

The process sequence is advantageously designed allothermic, since at the same time both highly exothermic reactions such as the oxidation of the carbon ($C+O_2 \rightarrow CO_2$) and endothermic reactions such as the formation of carbon monoxide according to the Boudouard reaction ($2\,CO \leftarrow C+CO_2$) occur. The reduction of the iron(III) compounds to magnetite is at least 75% under these conditions, but can be easily increased up to 90% and more by measures usual in the art.

Subsequently, the reduced fine powder is transported into a cooling drum with heat exchanger and after sufficient cooling fed to a magnetic separator in the next stage. It separates the components magnetite and ilmenite (iron titanium ore) from the non-magnetic residual mineral stock due to their highly magnetic characteristics, which essentially includes non-magnetic clay minerals, quartz, lime as well as small amounts of non-magnetic iron ore.

The clay minerals can be employed as a cement addition since their chemical composition largely corresponds to the materials occurring in cement, and thus so-called iron cement can be produced. By addition of further burnt lime, the hydraulic character of the cement addition can be matched to the respective requirement. Moreover, the non-magnetic mineral residue can be used as a water retainer due to the clay minerals or as a soil improver or mineral fertilizer, respectively, due to the lime and iron content, respectively.

The invention claimed is:

1. Method for obtaining magnetite by means of red mud, which is produced by the Bayer method used for aluminum production,
   wherein the method includes at least the reduction of goethite in said red mud to magnetite with at least one reductant, comprising the steps of:
   a) mixing the red mud with the reductant, wherein the reductant includes at least a vegetable oil and/or a fat;
   b) combusting the reaction mixture with controlled air supply during a predetermined time interval in a predetermined temperature range;
   c) separating the solid components from the reaction mixture;
   d) crushing the solid components; and
   e) separating at least a first component including at least magnetite and at least a second solid component, wherein
   in step b), the air supply is controlled such that the reaction first proceeds under over-stoichiometric conditions and subsequently proceeds under sub-stoichiometric conditions.

2. Method according to claim 1,
characterized in that
a palm oil and/or a soya oil and/or a rape oil is used as the vegetable oil.

3. Method according to claim 1,
characterized in that
the predetermined temperature range in step b) is at least 650° C. and/or at most 1000° C.

4. Method according to claim 1,
characterized in that
combustion gases developing in step b) are returned into the reaction mixture.

5. Method according to claim 4,
characterized in that
the returned combustion gases include at least carbon monoxide and/or hydrogen.

6. Method according to claim 1,
characterized in that
step e) includes use of a magnetic separator.

7. Method according to claim 1,
characterized in that
in step a), at least one further component including at least calcium carbonate is additionally admixed to the red mud and the reductant.

8. Method according to claim 7,
characterized in that
the second component separated in step e) includes at least one cement addition material.

9. Method according to claim 8,
characterized in that
the cement addition material includes silica and/or silicates and/or aluminosilicates.

10. Method according to claim 1, further comprising the step of:
reducing hematite in said red mud to magnetite.

* * * * *